No. 886,153. PATENTED APR. 28, 1908.
J. B. PFAU.
HORSE BRUSH.
APPLICATION FILED APR. 22, 1907.
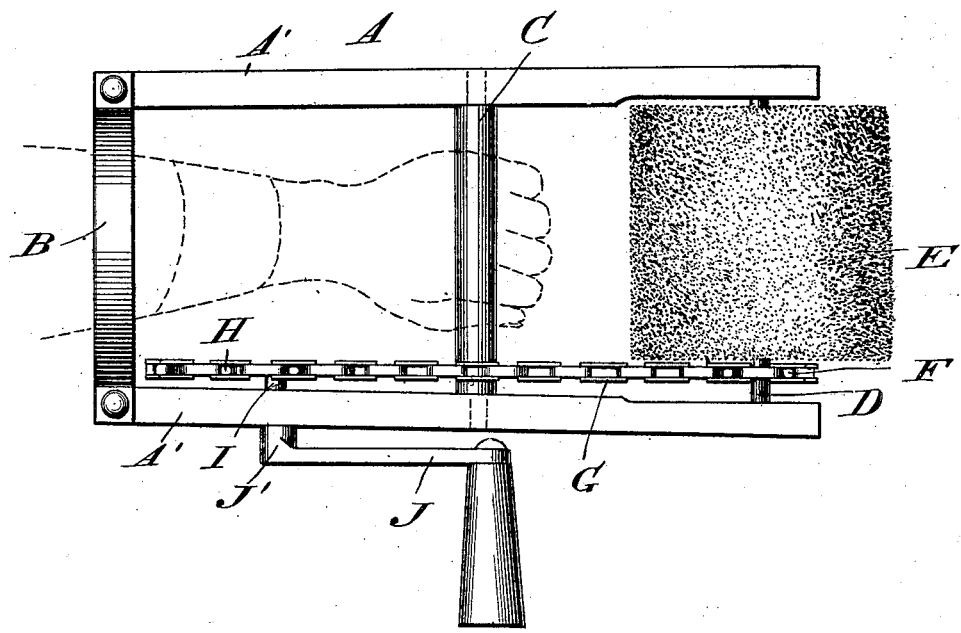
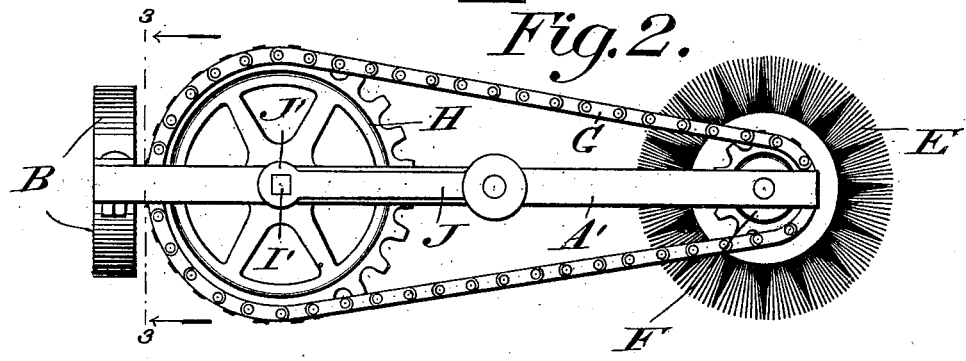
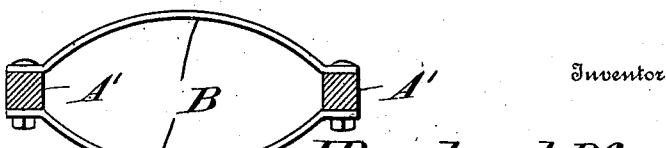
Witnesses
Inventor
J. Bernhard Pfau.

UNITED STATES PATENT OFFICE.

JOHN BERNARD PFAU, OF DULUTH, MINNESOTA.

HORSE-BRUSH.

No. 886,153.  Specification of Letters Patent.  Patented April 28, 1908.

Application filed April 22, 1907. Serial No. 369,554.

*To all whom it may concern:*

Be it known that I, JOHN BERNARD PFAU, a citizen of the United States, residing at Duluth, in the county of St. Louis and State of Minnesota, have invented a new and useful Improvement in a Horse-Brush, of which the following is a specification.

This invention relates to horse brushes, and more particularly to rotary brushes for horses, the object being to provide a brush so constructed that it can be readily held with one hand and operated with the other, so that a horse can be easily and quickly groomed, thereby saving a great deal of time and labor.

Another object of my invention is to provide a brush which is very simple and cheap in construction and one which can be easily handled and operated.

With these objects in view, the invention consists in the novel features of construction, combination and arrangement of parts, hereinafter fully described and pointed out in the claims.

In the drawings forming a part of this specification:—Figure 1 is a top plan view of my improved horse brush showing it arranged on an arm of a person. Fig. 2 is a side elevational view of the same, Fig. 3 is a sectional view taken on the line 3—3 of Fig. 2.

In the drawing A indicates the frame of my improved brush which is formed of a pair of parallel bars A' connected together at one end by a pair of bowed plates B, through which the arm of the operator is adapted to be shoved, so as to support the same. A handle C connects the parallel bars centrally which is adapted to be grasped by the hand of the operator, so that the frame can be securely held and moved into any position desired on the horse.

Mounted in the parallel bars of the frame, adjacent its open end is a shaft D carrying a brush E and provided with a sprocket wheel F over which passes a sprocket-chain G carried by a sprocket wheel H secured on the shaft I which is mounted in one of the side bars of the frame, adjacent one end and is provided with a square end I' over which the socket J' of a crank-arm J is adapted to fit, so that the sprocket can be rotated by operating the crank arm.

The operation of the device is as follows:—
The arm is forced between the bowed plates of the frame, and the handle is grasped by the hand of the operator, and the brush placed against the animal to be groomed and with the other hand the crank arm is operated, which rotates the brush through the medium of the sprocket-chain, so as to rotate the brush which will clean the horse in a very few minutes.

Having thus fully described my invention, what I claim as new and desire to secure by Letters Patent is:—

1. The combination with a frame, of a shaft mounted in said frame carrying a brush, means adapted to receive the arm of a person whereby the frame may be supported, and means for operating said shaft.

2. In a device of the kind described, the combination with a frame provided with a handle and an opening adapted to receive the arm of a person, of a rotary brush mounted in said frame, and means for operating said brush.

3. In a device of the kind described, the combination with a pair of parallel bars, of a pair of bowed plates connecting one end of said bars, a handle secured between said bars and a rotary brush mounted between said bars for the purpose described.

4. In a device of the kind described, the combination with a pair of bars, of a handle connecting said bars, bowed plates secured on one end of said bars, a shaft mounted in the other end of said bars, a brush secured on said shaft, a sprocket secured on said shaft, a shaft mounted in one of said bars, a sprocket secured on the last mentioned shaft, a chain mounted on said sprocket passing over the first mentioned sprocket and a crank arm for operating said shaft for the purpose described.

5. A brush of the kind described comprising a frame formed of a pair of parallel bars, a pair of bowed plates connecting one end of said bars forming an opening adapted to receive the arm of a person, a handle connecting said bars centrally and adapted to be grasped by the hand, a shaft mounted in the bars adjacent the open end of the frame, a brush secured on said shaft, a sprocket secured on said shaft at one end of the brush, a shaft mounted in the side bar and carrying a sprocket and a crank, and a sprocket chain passing over the said sprockets for the purpose set forth.

JOHN BERNARD PFAU.

Witnesses:
EDITH GILINSON,
MARTHA SPINK.